(12) United States Patent
Slowiak et al.

(10) Patent No.: US 12,469,076 B2
(45) Date of Patent: Nov. 11, 2025

(54) AUTHORIZATION CODE FOR ACCESS

(71) Applicant: Early Warning Services, LLC, Scottsdale, AZ (US)

(72) Inventors: Gregory Slowiak, Chicago, IL (US); Michael Dempsey, Chicago, IL (US); Dougal J. Brindley, Alameda, CA (US)

(73) Assignee: Early Warning Services, LLC, Scottsdale, AZ (US)

( * ) Notice: Subject to any disclaimer, the term of this patent is extended or adjusted under 35 U.S.C. 154(b) by 302 days.

(21) Appl. No.: 18/088,114

(22) Filed: Dec. 23, 2022

(65) Prior Publication Data
US 2023/0125547 A1    Apr. 27, 2023

Related U.S. Application Data

(63) Continuation-in-part of application No. 17/716,516, filed on Apr. 8, 2022, now Pat. No. 11,847,694, and
(Continued)

(51) Int. Cl.
*G06F 7/04* (2006.01)
*G06F 9/445* (2018.01)
(Continued)

(52) U.S. Cl.
CPC ............ *G06Q 40/03* (2023.01); *G06F 9/445* (2013.01); *G06F 21/305* (2013.01);
(Continued)

(58) Field of Classification Search
CPC ............... G06F 21/305; G06F 21/6263; H04L 63/0876; H04L 63/0884; H04L 63/126
See application file for complete search history.

(56) References Cited

U.S. PATENT DOCUMENTS 10,255,598 B1   4/2019  Dean et al.
11,784,995 B1   10/2023 Slowiak et al.
(Continued)

FOREIGN PATENT DOCUMENTS

WO      2019118682 A1    6/2019

OTHER PUBLICATIONS

Sharma et al, Identity and Access Management A Comprehensive Study, IEEE, Oct. 10, 2015, pp. 1481-1485. (Year: 2015).*
(Continued)

*Primary Examiner* — Philip J Chea
*Assistant Examiner* — Jenise E Jackson
(74) *Attorney, Agent, or Firm* — Kilpatrick Townsend & Stockton LLP (57) ABSTRACT

A method for sharing digital identity data, the method comprising, using the identity network, receiving an indication of consent from a user device to share a plurality of identity attributes with a relying party, wherein the plurality of identity attributes are associated with a user of the user device, generating an internal authorization code after receiving the consent, providing the internal authorization code to the user device, receiving the internal authorization code from the relying party, in response to receiving the internal authorization code, providing an internal access token to the relying party, receiving the internal access token from the relying party, and in response to receiving the access token, providing the plurality of identity attributes to the relying party.

17 Claims, 8 Drawing Sheets

Related U.S. Application Data a continuation-in-part of application No. 16/908,456, filed on Jun. 22, 2020, now Pat. No. 11,888,849, and a continuation-in-part of application No. 16/908,443, filed on Jun. 22, 2020, now Pat. No. 11,784,995, said application No. 17/716,516 is a continuation of application No. 16/908,460, filed on Jun. 22, 2020, now Pat. No. 11,328,356.

(60) Provisional application No. 63/293,462, filed on Dec. 23, 2021, provisional application No. 62/864,911, filed on Jun. 21, 2019, provisional application No. 62/864,891, filed on Jun. 21, 2019, provisional application No. 62/864,900, filed on Jun. 21, 2019, provisional application No. 62/864,889, filed on Jun. 21, 2019, provisional application No. 62/864,906, filed on Jun. 21, 2019.

(51) Int. Cl.
| | | |
|---|---|---|
| *G06F 21/30* | (2013.01) | |
| *G06F 21/62* | (2013.01) | |
| *G06Q 40/03* | (2023.01) | |
| *H04L 9/08* | (2006.01) | |
| *H04L 9/40* | (2022.01) | |
| *H04L 41/147* | (2022.01) | |
| *H04L 67/50* | (2022.01) | |

(52) U.S. Cl.
CPC ........ *G06F 21/6263* (2013.01); *H04L 9/0819* (2013.01); *H04L 41/147* (2013.01); *H04L 63/0876* (2013.01); *H04L 63/0884* (2013.01); *H04L 63/126* (2013.01); *H04L 67/535* (2022.05)

(56) References Cited

U.S. PATENT DOCUMENTS

| | | | |
|---|---|---|---|
| 2014/0143837 A1* | 5/2014 | Fletcher | H04L 63/105 726/4 |
| 2015/0332029 A1* | 11/2015 | Coxe | G06F 21/31 726/5 |
| 2017/0250972 A1* | 8/2017 | Ronda | H04L 9/0891 |
| 2018/0219846 A1 | 8/2018 | Poschel et al. | |
| 2019/0182042 A1 | 6/2019 | Ebrahimi et al. | |
| 2020/0153814 A1* | 5/2020 | Smolny | H04L 63/102 |
| 2020/0162447 A1* | 5/2020 | Fletcher | H04L 63/107 |
| 2021/0099454 A1 | 4/2021 | Rahimi et al. | |
| 2022/0029985 A1 | 1/2022 | Malhotra et al. | |

OTHER PUBLICATIONS

Singh et al, Identity Management in Cloud Computing through Claim-Based Solution, IEEE, Feb. 22, 2015, pp. 524-529. (Year: 2015).*

Notice of Allowance issued U.S. Appl. No. 16/908,443, dated Jun. 1, 2023 in 12 pages.

Non-Final Office Action issued in U.S. Appl. No. 16/908,456, dated Jun. 26, 2023 in 15 pages.

Notice of Allowance issued in U.S. Appl. No. 16/908,456, dated Sep. 19, 2023, 19 pages.

Notice of Allowance issued U.S. Appl. No. 17/716,516, dated Aug. 2, 2023 in 10 pages.

Goswami et al., "A Replay Attack Resilient System for PKI Based Authentication in Challenge-Response Mode for Online Application", IEEE, 3rd International Conference on Eco-friendly Computing and Communication Systems, Dec. 21, 2014, pp. 144-148.

Vassilev et al., "Personal Brokerage of Web Service Access", IEEE Security and Privacy Magazine, vol. 5, No. 5, Oct. 1, 2007, pp. 24-31.

* cited by examiner

AUTHORIZATION CODE FOR ACCESS

CROSS REFERENCE

This application claims the benefit of U.S. Provisional Application Ser. No. 63/293,462 by BRINDLEY, entitled "AUTHORIZATION CODE FOR ACCESS," filed Dec. 23, 2021, the disclosure of which is incorporated by reference herein in its entirety.

This application is a continuation-in-part of U.S. patent application Ser. No. 16/908,456 by Slowiak et al., entitled "DIGITAL IDENTITY STEP-UP," filed Jun. 22, 2020.

This application is a continuation-in-part of U.S. patent application Ser. No. 16/908,443 by Slowiak et al., entitled "DIGITAL IDENTITY LOCK," filed Jun. 22, 2020.

This application is a continuation-in-part of U.S. patent application Ser. No. 17/716,516 by Slowiak et al., entitled "DIGITAL IDENTITY LOCK," filed Apr. 8, 2022, which is a continuation of U.S. patent application Ser. No. 16/908,460 by Slowiak et al., issued as U.S. Pat. No. 11,328,356, entitled "DIGITAL IDENTITY LOCK," filed Jun. 22, 2020.

Each of U.S. patent application Ser. Nos. 16/908,456, 16/908,443, and 16/908, 460 claims the benefit of priority to: U.S. Patent Application No. 62/864,891 by Woodward et al., entitled "DIGITAL IDENTITY," filed Jun. 21, 2019; U.S. Patent Application No. 62/864,900 by Woodward et al., entitled "DIGITAL IDENTITY SIGN-UP," filed Jun. 21, 2019; U.S. Patent Application No. 62/864,906 by Woodward et al., entitled "DIGITAL IDENTITY SIGN-IN," filed Jun. 21, 2019; U.S. Application No. 62/864,911 by Woodward et al., entitled "DIGITAL IDENTITY STEP-UP," filed Jun. 21, 2019; and U.S. Patent Application No. 62/864,889 by Woodward et al., entitled "DIGITAL IDENTITY LOCK," filed Jun. 21, 2019, each of which is incorporated by reference herein in its entirety.

BACKGROUND

Most companies have an online presence today and each has information about each of its users and customers. However, authentication of a user is largely handled piecemeal by each company with little verification of the user by a trusted source. The current way that users are onboarded and authenticated lacks security, consistency, and ease of use for both the companies and the users. Additionally, current methods to perform identity verification online have considerable drawbacks in coverage, validity, and usability.

SUMMARY

Embodiments of the present technology are directed to systems and methods for using identity attributes supplied by a user's trusted identity provider to sign up for and/or log into a website and/or mobile application of a relying party. Embodiments leverage the relationship between the user and the trusted identity provider (such as a bank or other financial institution), as well as banking regulations, to provide secure techniques for a relying party to authenticate an identity of a digital user.

One aspect of the disclosure provides a method for sharing digital identity data, the method comprising, using an identity network, receiving an indication of consent from a user device to share a plurality of identity attributes with a relying party, wherein the plurality of identity attributes are associated with a user of the user device, generating an internal authorization code after receiving the consent, providing the internal authorization code to the user device, receiving the internal authorization code from the relying party, in response to receiving the internal authorization code, providing an internal access token to the relying party, receiving the internal access token from the relying party, and in response to receiving the access token, providing the plurality of identity attributes to the relying party. The method may further comprise receiving a sign-up request for the user from the relying party, displaying, within a user interface of a user device, a list of identity providers, receiving a selection of an identity provider from the list of identity providers, in response to receiving the selection, causing the user interface to display a login page associated with the selected identity provider, and receiving a validation of authentication of the user. The method may further comprise receiving, from the identity provider, a plurality of identity attributes associated with the user, and in response to receiving the validation, displaying, within the user interface, the plurality of identity attributes associated with the user. The method may further comprise receiving an identity provider authorization code from the selected identity provider, and providing the identity provider authorization code to the selected identity provider to access the identity attributes of the user. The identity provider authorization code may be received after or during receipt of the consent from the user device. Providing the plurality of identity attributes to the relying party may comprise encrypting the plurality of identity attributes and transmitting the plurality of identity attributes to the relying party. The plurality of identity attributes may comprise at least one identity attribute selected from a group comprising of a name of the user, an address of the user, a telephone number of the user, an email address of the user, a gender of the user, a birthdate of the user, a peer to peer payment account token of the user, a driver's license number of the user, and a social security number of the user.

Another aspect of the disclosure provides for an identity network for sharing digital identity data, comprising, one or more processors, and a memory having stored thereon instructions that, upon execution by the one or more processors, cause the one or more processors to receive consent from a user device to share a plurality of identity attributes with a relying party, wherein the plurality of identity attributes are associated with a user of the user device, generate an internal authorization code after receiving the consent, provide the internal authorization code to the user device, receive the internal authorization code from the relying party, in response to receiving the internal authorization code, provide an access token to the relying party, receive the access token from the relying party, and in response to receiving the access token, provide the plurality of identity attributes to the relying party. The instructions may further cause the one or more processors to receive a sign-up request for the user from the relying party, display within a user interface of a user device, a list of identity providers, receive a selection of an identity provider from the list of identity providers, in response to receiving the selection, cause the user interface to display a login page associated with the selected identity provider, and receive a validation of authentication of the user. The instructions further cause the one or more processors to receive from the identity provider, the plurality of identity attributes associated with the user, and in response to receiving the validation, display the plurality of identity attributes associated with the user within the user interface. Providing the plurality of identity attributes to the relying party may comprise encrypting the plurality of identity attributes and transmitting the plurality of identity attributes to the relying party. The plurality of identity attributes may comprise at least one identity attribute selected from a group comprising of a name of the user, an address of the user, a telephone number of the user, an email address of the user, a gender of the user, a birthdate of the user, a peer to peer payment account token of the user, a driver's license number of the user, and a social security number of the user. The instructions may further cause the one or more processors to receive an identity provider authorization code from the selected identity provider and provide the identity provider authorization code to the selected identity provider to access the identity attributes of the user. The identity provider authorization code may be received after or during receipt of the consent from the user device.

Another aspect of the disclosures provides for a non-transitory computing-device readable storage medium on which computing-device readable instructions of a program are stored, the instructions, when executed by one or more computing devices, causing the one or more computing devices to perform a method, comprising receiving an indication of consent from a user device to share a plurality of identity attributes with a relying party, wherein the plurality of identity attributes are associated with a user of the user device, generating an internal authorization code after receiving the consent, providing the internal authorization code to the user device, receiving the internal authorization code from the relying party, in response to receiving the internal authorization code, providing an internal access token to the relying party, receiving the internal access token from the relying party, and in response to receiving the access token, providing the plurality of identity attributes to the relying party. The non-transitory computing-device readable storage medium may further comprise receiving a sign-up request for the user from the relying party, displaying, within a user interface of a user device, a list of identity providers, receiving a selection of an identity provider from the list of identity providers, in response to receiving the selection, causing the user interface to display a login page associated with the selected identity provider, and receiving a validation of authentication of the user. The non-transitory computing-device readable storage medium may further comprise receiving, from the identity provider, a plurality of identity attributes associated with the user, and in response to receiving the validation, displaying, within the user interface, the plurality of identity attributes associated with the user. The non-transitory computing-device readable storage medium may further comprise receiving an identity provider authorization code from the selected identity provider, and providing the identity provider authorization code to the selected identity provider to access the identity attributes of the user. Providing the plurality of identity attributes to the relying party may comprise encrypting the plurality of identity attributes and transmitting the plurality of identity attributes to the relying party. The plurality of identity attributes may comprise at least one identity attribute selected from a group comprising of a name of the user, an address of the user, a telephone number of the user, an email address of the user, a gender of the user, a birthdate of the user, a peer to peer payment account token of the user, a driver's license number of the user, and a social security number of the user.

DETAILED DESCRIPTION

The explosion of online user activity and data over the past decades have resulted in a disparate system in which most online companies have developed their own systems for users to sign-up, sign in, and utilize their services. Authentication of users is often difficult to ensure that online identity theft and other sinister activities are avoided. Further, the process for creation of new accounts and tracking of countless passwords for users is tedious.

To solve the problem of invalid authentication and password security for users, described herein is a system for utilizing identity attributes of a user known to a trusted identity provider (such as a bank or other financial institution) that a user may use to create new accounts and log into existing accounts with relying parties of the system. The identity network allows a user to sign up with a relying party using identity attributes from an identity provider and solves the technical problem faced by many online companies related to authentication of digital users. For example, online companies may require that a user provide information to create an account. However, the company has no way to verify or authenticate the new user. Companies cannot be sure that existing users are verified other than through their own password systems, which suffer from password theft issues and invalid initial sign up. Accordingly, the technical solution described herein provides a consistent and technical way for the company to authenticate the user using a universal online digital identity.

Users often have a trusted relationship with their banks, and banks are regulated so certain precautions are taken by banks to ensure the user is a legitimate and authenticated user. Banks and other providers that have regulated processes for identifying users may be used to authenticate users with a digital identity authentication and provide information on the users for relying parties by becoming an identity provider in the disclosed identity network. Relying parties, such as insurance companies, retailers, and so forth can enroll with the identity network to gain the benefit of the regulated user identification procedures of the identity provider authenticating the digital identity of users and customers and providing verified identity attributes upon account sign-up for a new customer. The identity network can broker authentication and information exchange using cryptographic technology and other verifiable methods between the relying party and the identity provider. Additional technological value can be provided by the identity network by overseeing and identifying suspicious activity overall for a device or user, obtaining information from various third parties for the relying party to further validate the user, and so forth.

Embodiments may involve authenticating a user. For example, a relying party with which the user is interacting may submit a request to an identity network to enroll in an identity sharing/matching system (e.g., a digital identity system). The request may initiate an Open ID Connect (OIDC) redirection between the relying party and the identity network. The user may select a preferred identity provider to use for identity sharing/matching, such as through an interface provided by the relying party and/or identity network, which may initiate an OIDC redirection between the identity network and the selected identity provider (such as via a browser and/or a native mobile application). The request from the relying party may prompt the user, through the selected identity provider's mobile application and/or browser-based online banking application, to review and approve or deny the sharing and/or matching of the user's identity attributes. Upon receiving the user consent, the selected identity provider may return an authorization code to the identity network, which may provide the authorization code to the relying party.

To share/match the identity attributes, the relying party may exchange the authorization code for an access token via the identity network. For example, the identity network may initiate a corresponding call to the identity provider to exchange the authorization code for an identity provider-issued access token, which may be returned to the relying party. The relying party may then present the access token to the identity network. The identity network may initiate a call to the identity provider to collect the identity attributes using the identity provider-issued access token for sharing and/or matching purposes.

Figure 1:
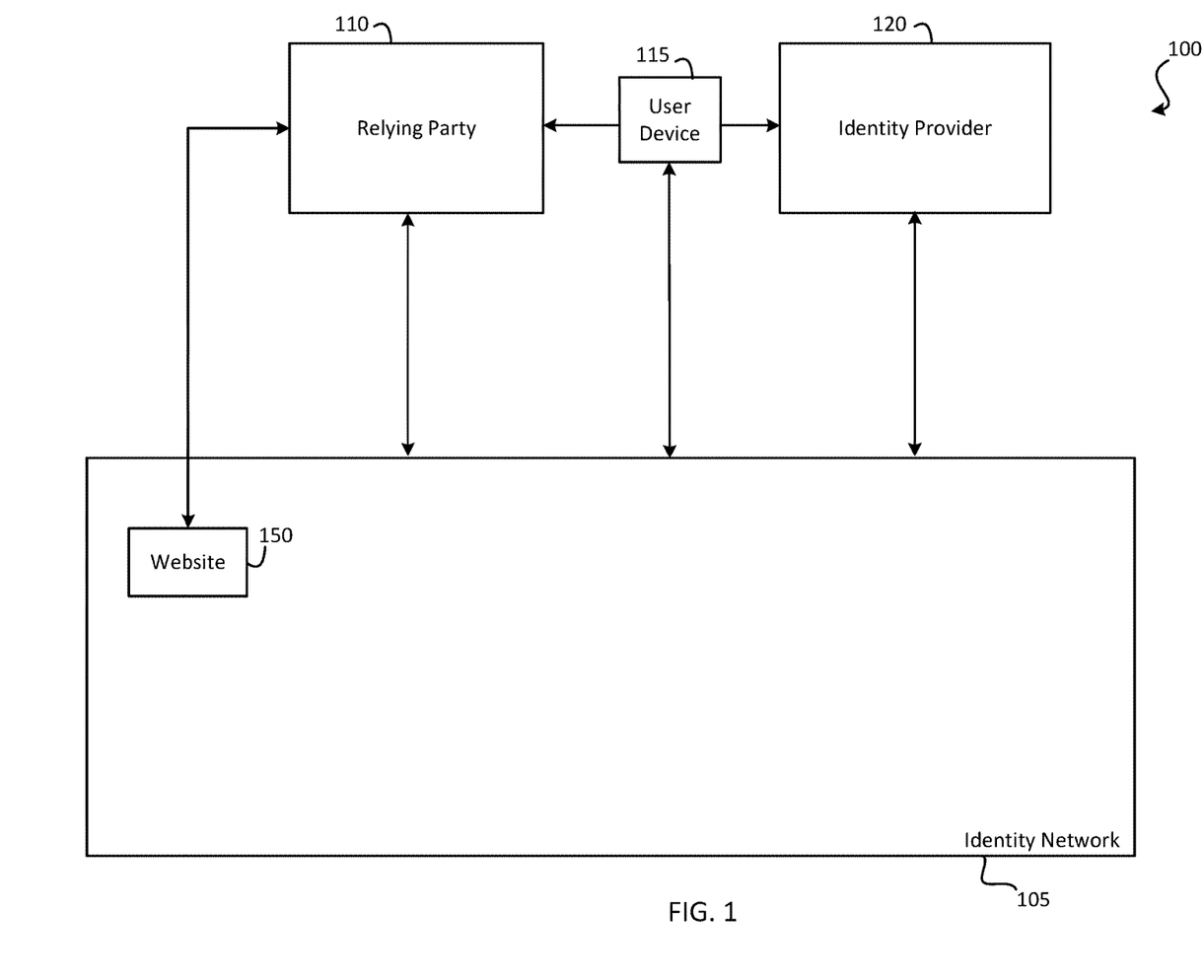
FIG. 1 illustrates an example system for providing an authenticated, universal digital identity for a user, according to an embodiment.

FIG. 1 illustrates an example digital identity system 100 for utilizing identity attributes of a user known to a trusted identity provider to sign up for and/or log into accounts with relying parties. System 100 includes an identity network 105, a relying party 110, a user device 115, and an identity provider 120. Components or functionality described may be combined into fewer components or expanded into more components without departing from the scope of the present application.

The identity network 105 may include a network of one or more computers, such as computing device 600 shown in FIG. 6, as described below. The identity network 105 may include a website 150. The identity network 105 may include other components or functionality than discussed, or may include components combined into fewer or more components without departing from the scope of the present application. The identity network 105 provides the functionality to broker the authentication and information exchange between the relying party 110 and the identity provider 120, as discussed in more detail herein.

The website 150 may be an internet interface provided by the identity network 105 that the relying party 110 may use to redirect the end user, for example, to select their identity provider 120 when a request is initiated. The website 150 may redirect the user to their identity provider 120 website or mobile application via a matrix barcode (e.g., a QR code), an application link, a website link, or via a short message service (SMS) or mobile push notification. In some embodiments, the relying party 110 may include a software development kit from the identity network 105 that is used to redirect the user to the website 150 to select the user's identity provider 120 when a request is initiated.

The relying party 110 may include one or more computing devices of any company or entity that would like to be able to authenticate the digital identity of a user. Examples of relying parties 110 include insurance companies, retailers, travel companies (e.g., airlines, hotels, cruise lines), utility companies, and the like. While only a single relying party 110 is depicted in FIG. 1 for the sake of simplicity of explanation, any number of relying parties 110 may be included in system 100.

Figure 6:
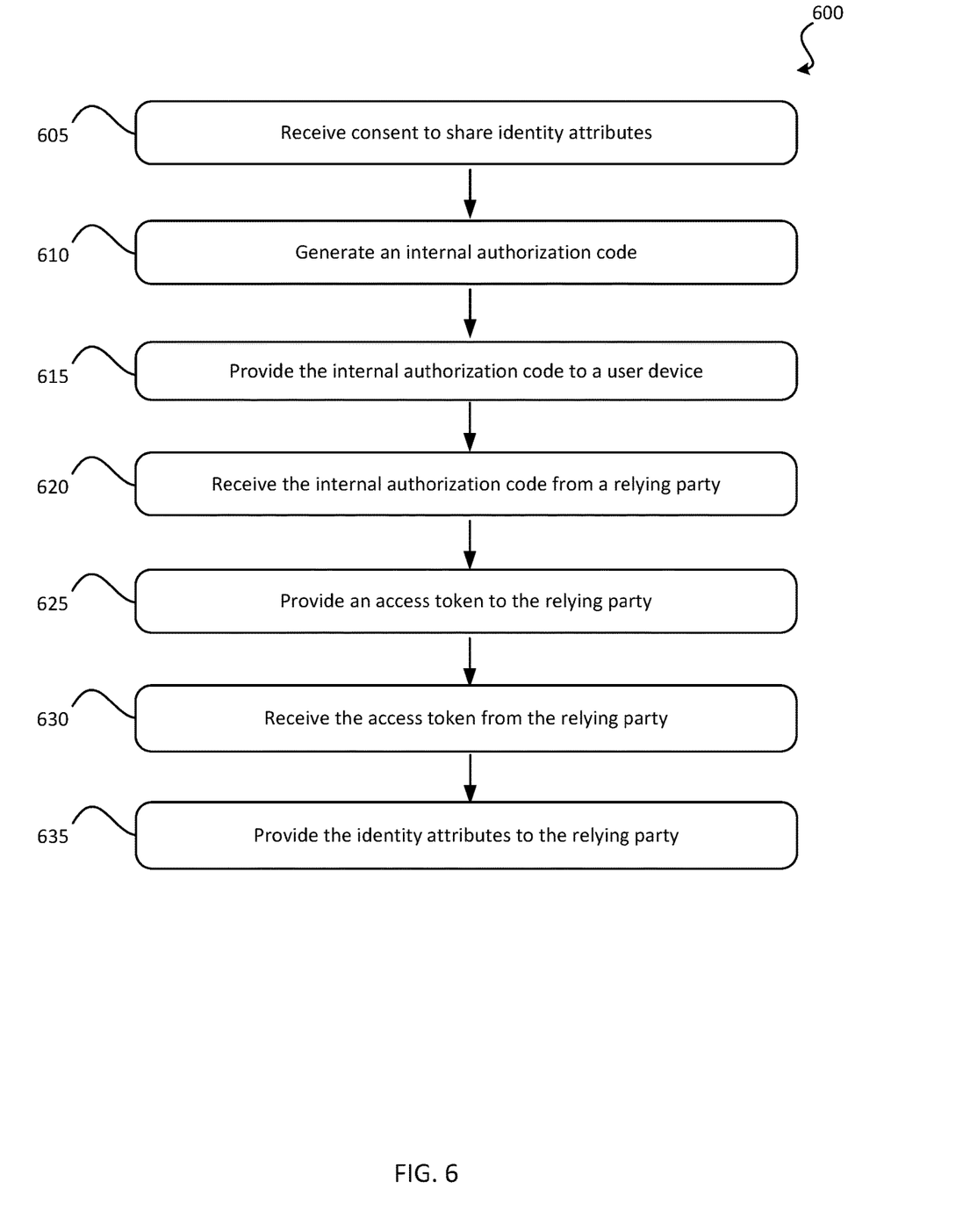
FIG. 6 illustrates an example method for sharing digital identity data in an account creation and/or sign in process according to an embodiment.

The user device 115 may be any suitable computing device, such as computing device 600, as depicted and described with respect to FIG. 6, of a user. For example, the user device 115 may be a laptop, smartphone, desktop computer, tablet, smartwatch, and the like. While only a single user device 115 is depicted in FIG. 1 for the sake of simplicity of explanation, any number of user devices 115 may be included in system 100.

The identity provider 120 may include one or more computing devices of any suitable company that can authenticate a user (having user device 115) for the relying party 110. The identity provider 120 may include, for example, banks and/or other financial institutions. The identity provider 120 may have detailed information regarding the identity of the user and may have previously verified the identity of the user of user device 115 because, for example, financial institutions are regulated by the government with respect to identifying customers with specificity. In this manner, the identity providers 120 may be relied upon to have accurately verified the identity of the user of user device 115. While only a single identity provider 120 is depicted in FIG. 1 for the sake of simplicity of explanation, any number of identity providers 120 may be included in system 100.

In use, a user may access a relying party 110 website 150 using the user device 115 to sign up with the relying party 110. For example, the user may wish to initiate a new relationship with the relying party 110 to, for example, become a customer of the relying party 110. The relying party 110 may request digital identity authentication and information for the user of the user device 115 from the identity network 105 via website 150. In some embodiments, the user device 115 may access a mobile application and/or website 150 of the relying party 110. The mobile application may access website 150 with an identity assertion to the relying party 110 to access an access-controlled portion of the website 150. The identity assertion may be a request to authenticate the digital identity of the user and, in some cases, request additional information about the user.

In response, the relying party 110 may direct the user device 115 to a page of the identity network 105 on the website 150. On that page, the identity network 105 may provide one or more identity providers 120 for the user to select for authenticating the user's digital identity. For example, the identity network 105 may provide a list including many identity providers 120, and the user may select an identity provider with which the user has a relationship with. For example, if the user is a customer of BankA, and BankA is provided by the website as an identity provider in a list of identity providers, the user may select BankA as the identity provider for authenticating that user's digital identity. If the user has a relationship with multiple identity providers 120, the user may select any one of the identity providers 120 with which the user has a relationship.

Once the user selects an identity provider 120, the identity network 105 may direct the user to a page of the selected identity provider 120 (e.g., a login page). On the page of the identity provider 120, the user may be presented with a login page associated with the selected identity provider 120. The user may enter login credentials to be authenticated at the selected identity provider 120. The selected identity provider 120 may verify the login credentials entered by the user to authenticate the user using various authentication techniques. For example, the identity provider 120 may offer single and/or multi-factor authentication methods in some embodiments to verify the login credentials entered by the user (e.g., by comparing the entered login credentials against a stored list of login credentials associated with the user and/or providing a verification code to a trusted device of the user for the user to confirm with the identity provider 120). Based on these authentication techniques, the identity provider 120 may indicate that the identity of the user has been authenticated. If the identity provider 120 fails to authenticate the identity of the user, the identity provider 120 may notify the identity network 105 that the user's identification has not been verified. Alternatively or additionally, the identity provider 120 may simply not let the user progress further with the authentication process, as described below.

Upon successful authentication of the user, the selected identity provider 120 may provide a number of identity attributes of the user to the identity network 105. The identity attributes may include, for example, the user's name, address, phone number, email address, gender, birthdate, peer to peer payment network token, and/or other identifying information. The identity attributes may be presented to the user by the identity network 105 on a confirmation page of the identity network 105. The confirmation page of the identity network 105 may be hosted on the website 150 or may be hosted on a page of the selected identity provider 120 (e.g., the confirmation page 300C, as shown in FIG. 3C). The user may review the identity attributes and may submit a consent approval to the identity network 105 to share the identity attributes with the relying party 110. However, in other embodiments, the identity attributes may be shared directly by the identity provider 120 with the relying party 110. In some embodiments, only those particular identity attributes requested by the relying party 110 may be provided by the identity network 105. Upon receiving the consent approval, the identity network 105 may redirect the user back to the relying party's website 150.

Once the user's identity attribute(s) have been provided to the relying party 110 by the identity network 105, the relying party 110 may utilize the shared identity attributes to authenticate the user's identity in the future. For example, the website 150 of the relying party 110 may present the user with a number of data fields in which to enter the user's identity attributes. The user may enter identity attributes in those data fields. The relying party 110 may store those provided identity attributes for use at a later step in the authentication process. Once the user has provided the identity attributes in the data fields, the user may be provided with a list of identity providers 120 (which may be the same or different from the list of identity providers 120 previously provided to the user). The user may select an identity provider 120 with which the user has already provided consent to share identity attributes, such as BankA. Once the user selects an identity provider 120, the user may be presented with a login page associated with the selected identity provider 120. The user may enter login credentials to be authenticated at the selected identity provider 120, which the selected identity provider 120 may verify, as discussed above.

Upon successful authentication of the user, the selected identity provider 120 may provide a number of identity attributes to the identity network 105 for presentation to the user on a confirmation page of the website 150 for the identity network 105. The user may review the identity attributes and consent to the identity network 105 sharing the identity attributes with the relying party 110. These identity attributes may then be shared with the relying party 110. The relying party 110 may then compare the set of identity attributes directly supplied by the user on the website 150 with those supplied by the identity provider 120 via the identity network 105 to determine whether the sets of identity attributes match. In some embodiments, only those identity attributes requested by the relying party 110 may be provided by the identity network 105.

The identity network 105 may redirect the user back to the relying party's website 150 to see the results of the comparison. If the relying party 110 determines that the identity attributes match, the relying party 110 may provide access to the user device 115 to access an access-controlled portion of the relying party's website 150. If the relying party 110 determines that the identity attributes do not match, the relying party 110 may provide a notification to the user device 115 that the user is not allowed access to the access-controlled portion of the relying party's website 150. Alternatively, if the relying party 110 determines that the identity attributes do not match, the relying party 110 may provide an indication to the user device 115 which of the data fields include identity attributes that do not match the identity attributes provided by the identity network 105 (e.g., the data fields may be highlighted or point at by an arrow, or the like). This may allow the user to change the indicated data fields to a different identity attribute that may match the first set of identity attributes. After this change, the relying party 110 may compare the sets of identity attributes again and, if the relying party 110 determine those sets match, the relying party 110 may provide the user device 115 with access to the access-controlled portion of the website 150.

The identity attributes may be placed into data bundles for relying parties 110 to request. The data bundles may be requested from identity providers 120 as scope bundles and/or individual claims.

Figure 2:
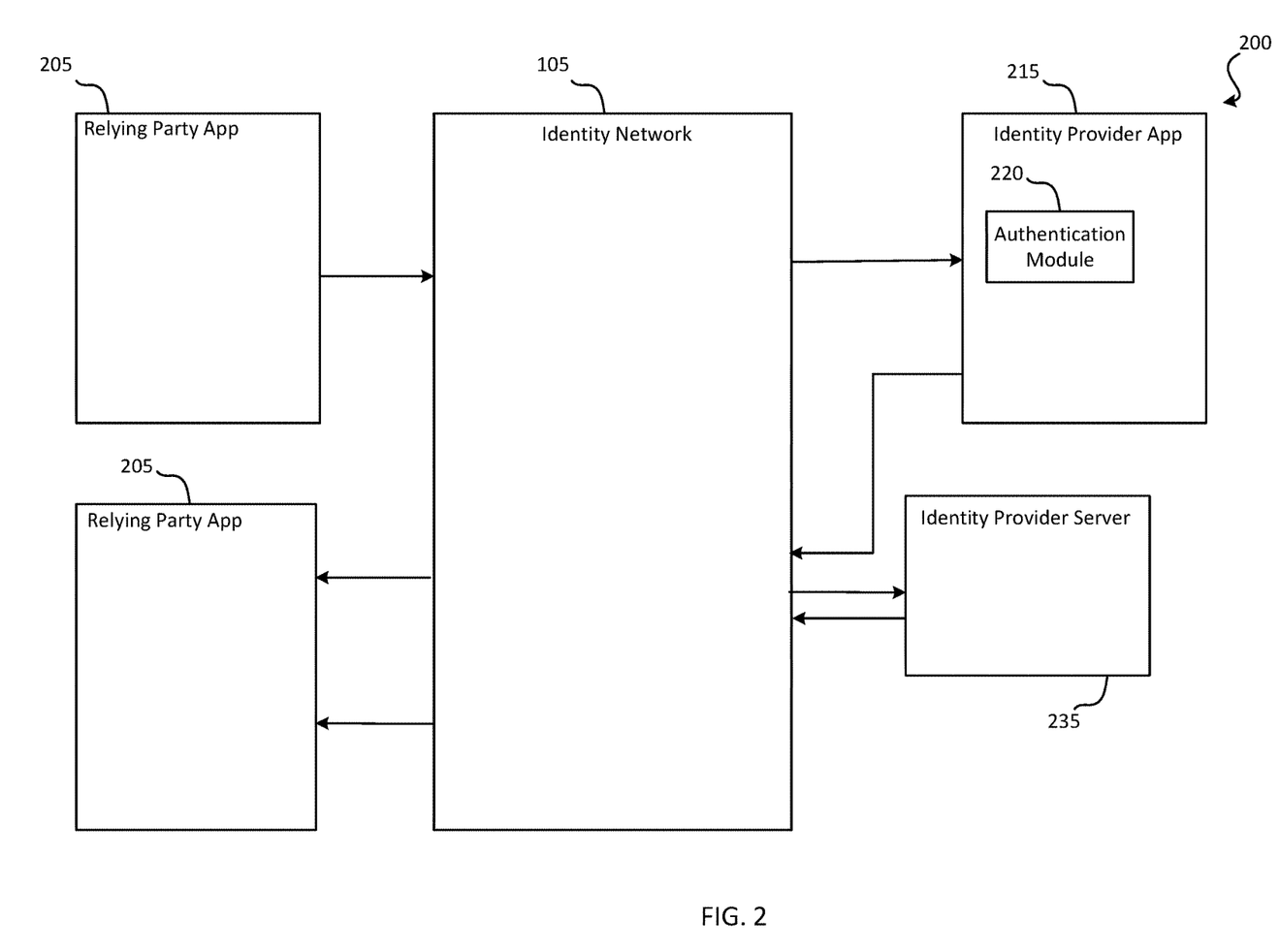
FIG. 2 illustrates an example data information flow using an authenticated, universal digital identity for a user, according to an embodiment.

FIG. 2 illustrates an example data flow 200 of data through a digital identity system. The data flow 200 includes the relying party application 205, the identity network 105, the identity provider application 215, and the identity provider server 235. The identity provider application 215 and the identity provider server 235 collectively are included in the identity provider 120 as described with respect to FIG. 1. Starting with the relying party application 205, associated with the relying party 110, the user may decide to sign-up for access to the relying party using the user's digital identity. In response, the relying party 110 may send a request to the identity network 105 to authenticate the user's identity. In some embodiments, the identity network 105 may provide a list of identity providers for the user to select from.

Once the identity provider 120 is selected, the identity network 105 may generate a token to associate the selected identity provider 120 with the user. This token may be stored in the identity network 105 to be used in the future by to expedite the authentication process. In particular, future requests to authenticate the user may include identifying the token associated with the user for the selected identity provider. Once the token is identified, the identity network 105 may look up the identity provider 120 associated with the token and launch the identity provider application 215 to the user, as discussed further below, without requiring the user to select form the list of identity providers 120. In some embodiments, the identity provider 120 may provide the token upon first request by the identity network 105 to authenticate the user with the identity provider 120.

The identity network 105 may generate a session ID and may provide the session ID to the relying party application 205. The session identifier may be used throughout the process to track the activity associated with the initial request from the relying party application 205 for the specific user.

Once the identity provider 120 is selected (or where the identity network 105 identifies a previously selected identity provider 120 associated with a token that is associated with the user), the identity provider application 215 corresponding to the selected identity provider 120 may be provided to the user. In some embodiments, where the user selects the identity provider 120, selecting the identity provider 120 may include selecting an application link (such as a deep link) associated with the identity provider application 215 to launch the identity provider application 215. The application link may include the session identifier generated by the identity network 105.

In the identity provider application 215, the user logs into their account and is subsequently authenticated with authentication module 220. For example, the identity provider 120 may verify the user through the authentication module 220 using the verification methods discussed above (e.g., single and/or multi-factor authentication methods). Upon successful authentication of the user, the identity provider 120 may provide a number of identity attributes associated with the user to the identity network 105. The identity network 105 may then provide the identity attributes to the identity provider application 215, which may display the identity attributes on a user interface of the user device 115. The user may review the identity attributes and may submit a consent approval on the identity provider application 215 (e.g., responding to a prompt displayed on the identity provider application 215 requesting consent) to provide consent to share the identity attributes with the relying party 110 or may decline such consent. If consent is declined, the process flow halts and nothing further happens, and/or a failure message is sent to the relying party application 205 indicating that the identity provider 120 will not be sharing the identity attributes of the user. When the user provides consent, the identity provider application 215 may provide the consent to the identity network 105.

The identity network 105, upon receiving the consent, may redirect the user device 115 from the identity provider application 215 to a page associated with the relying party application 205. The identity network 105 may also share the identity attributes with the relying party 110. In some embodiments, the identity network 105 may provide the relying party 110 a token that may be used by the relying party 110 to access the identity attributes directly from the identity network 105 (or another database), rather than transmitting the identity attributes to the relying party 110. In some embodiments, the relying party 110 may use this information in a sharing context in which the relying party 110 may utilize and/or store the identity attributes in a newly opened account for the user. For example, the relying party application 205 may use the identity attributes and/or other information to populate the user's information into the relying party application 205 registration form. In some embodiments, the relying party 110 may use the identity attributes in a matching context in which the relying party 110 may compare the identity attributes provided by the identity network 105 and identity provider 120 with identity attributes provided to the relying party 110 by the user to determine whether the identity attributes provided by the user match those provided by the identity network 105. If the relying party 110 determines that the identity attributes match, the relying party 110 may authenticate and verify the identity of the user. If the relying party 110 determines that the identity attributes do not match, the relying party 110 may halt the authentication process and, in some embodiments, notify at least one of the identification network 105 and/or user device 115 that the identity attributes do not match.

In some embodiments, the identity provider 120 and/or identity network 105 may encrypt the identity attributes and any other personal information. For example, the identity network 105 may transmit an encryption key with the session identifier to the relying party application 205 so that the relying party 110 has the key for decrypting the information. While a specific cryptographic key is described, other forms of cryptography and transmission of the cryptographic keys may be used without departing from the scope of the present application including symmetric cryptography, asymmetric cryptography, or any other suitable cryptography that maintains the security of the user's information between the parties.

Figure 3:
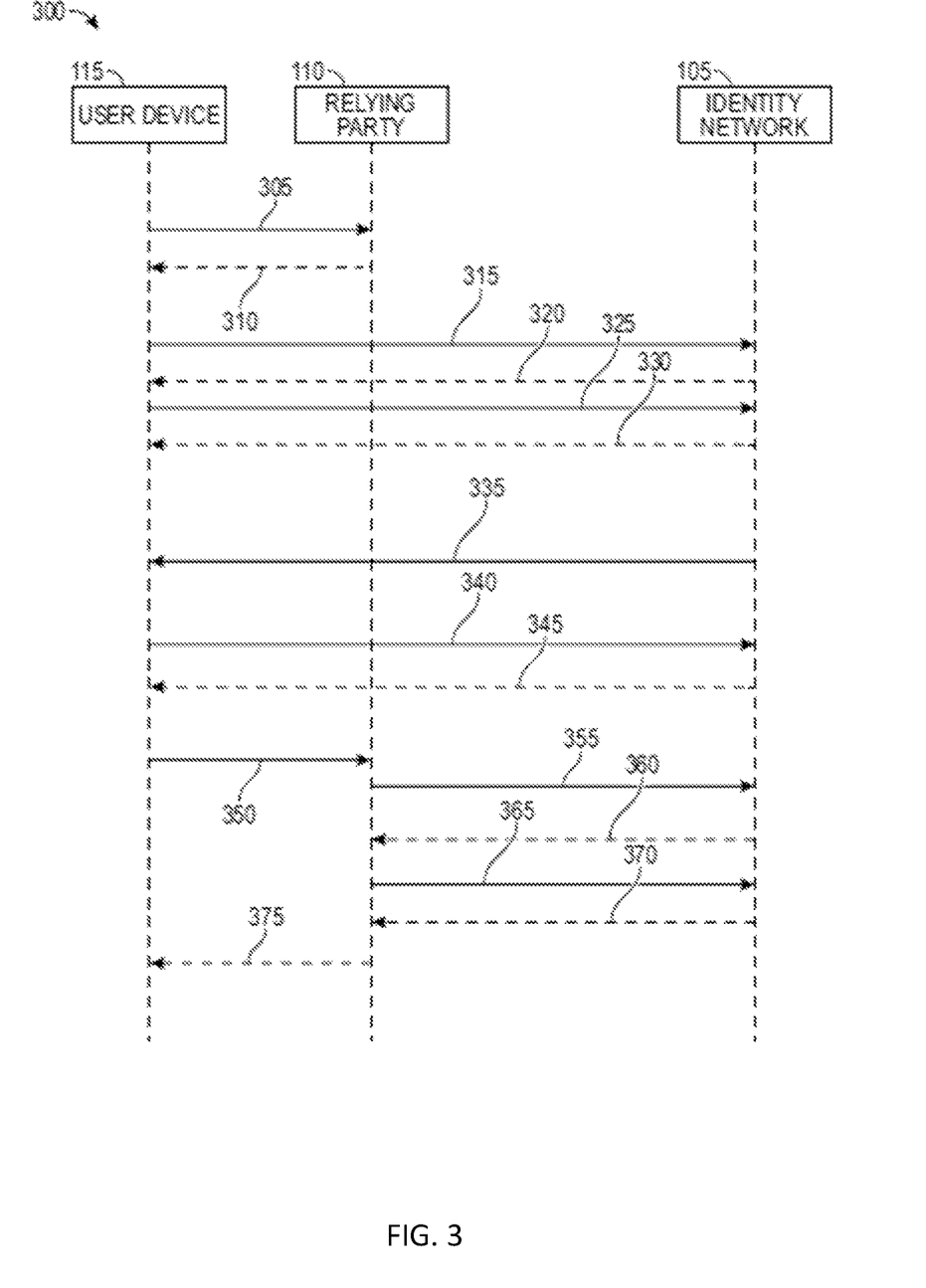
FIG. 3 illustrates an example method for sharing identity attributes according to an embodiment.

FIG. 3 illustrates a swimlane diagram illustrating an identity attribute sharing/matching flow according to embodiments of the present invention. At operation 305, a user, such as via user device 115, may submit a request to create an account and/or login to a mobile application and/or website of a relying party 110. For example, a browser of the user device 115 may submit a hypertext transfer protocol (HTTP) request, such as a POST request, to the relying party 110 website (although a similar flow may be performed from a mobile application of the relying party 110 that is executed on the user device 115). At operation 310, the relying party 110 may return a status code (such as a 3XX HTTP status code) back to the browser of the user device 115. The status code may include a redirect location set to an authorization endpoint of an entity such that providing the status code to the authorization endpoint of the entity. Endpoints are specific locations within an entity that provides certain data. Such locations may require a specific code or token to be accessed, as will be discussed further below. For example, the authorization endpoint may be a deep link into the native application of the entity or to a web-based endpoint of the entity (e.g., the website of the entity). In this manner, where the relying part 110 returns a status code to the user device 115 including a redirect location set to the identity network 105, such that providing the status code will include a redirect location set to the native application of the identity network 105 or the website of the identity network 105. The browser of the user device 115 may then send a request to be redirected to the authorization endpoint of the status code (e.g., the identity network 105) at operation 315. For example, the browser may submit another HTTP request, such as a GET request, to the authorization endpoint.

At operation 320, in response to the request, the identity network 105 may provide for display a page that includes a list of available identity providers 120 and that enables the user device 115 to select a desired identity provider 120 that will be used to share and/or match the user's identity attributes (e.g., an identity provider 120 that the user has a relationship with). The user device 115 may provide a selection of an identity provider 120 from among the list of identity providers 120 to the identity network 105 at operation 325. In response to the selection, the identity network 105 may return a status code (such as a 3XX HTTP status code) to the browser of the user device 115 at operation 330.

The status code may include a redirect location that is set to an authorization endpoint of the selected identity provider 120. For example, the authorization endpoint may be the web-based authorization endpoint of the selected identity provider 120 in some embodiments. In some embodiments, the authorization endpoint may include a redirect location to the authorization endpoint (such as a deep link into the native application) of the selected identity provider 120.

At operation 335, the selected identity provider 120 may authenticate the user and/or user device 115, and may collect consent from the user device 115 for sharing/matching of identity attributes with the relying party 110 via the identity network 105. For, example, the user device 115 may be redirected to a login screen of the selected identity provider 120, where the user may provide access credentials, such as a user name, password, PIN, biometric credentials, one-time passwords, etc. In some embodiments, single factor authentication techniques may be utilized to login the user, while other embodiments may implement multi-factor authentication techniques. Upon authenticating the user and/or user device 115 and receiving consent to share the identity tributes with the relying party 110, the selected identity provider 120 may redirect the user device 115 back to a page of the identity network 105.

The selected identity provider 120 may additionally provide an identity provider authorization code to the identity network 105. The identity provider authorization code may indicate that the identity provider 120 authorizes the identity network 105 to access the identity attributes from the identity provider 120. The identity network 105 may store the identity provider authorization code for later use. For example, the identity network 105 may exchange the identity provider authorization code for an identity provider access token. This identity provider access token may be provided to the identity provider 120 to access the identity attributes from the identity provider 120, as will be discussed further below.

The browser of the user device 115 may then submit a request (such as a GET request) to the identity network 105 at operation 340. For example, the request may be sent to an OIDC completion URL associated with the identity network 105. In response to the request, the identity network 105 may return to the user device 115 a status code (such as a 3XX HTTP status code) at operation 345. The status code may include an internal authorization code generated by the identity network 105 for the relying party 110 and/or a state of the relying party 110 (e.g., session context). The internal authorization code may indicate that the identity network 105 authorizes the relying party 110 to access the identity attributes of the user from the identity provider 120 via the identity network 105. The internal authorization code may be placed in a header of the response to the user device 115.

The browser of the user device 115 may then communicate a request (such as a GET request) to the redirect URI of the relying party 110 at operation 350 for the relying party 110 to access the identity attributes from the identity provider 120 via the identity network 120. The request to the relying party 110 may include the internal authorization code and/or the state of the relying party 110 provided by the identity network 105. The relying party 110 may then call a token endpoint of the identity network 105 to retrieve an internal access token for the identity attributes of the user by exchanging the internal authorization code for the internal access token at operation 355. The internal access token may be presented by the relying party 110 to the identity network 105 to access the identity attributes of the user from the identity network 105 at a user information endpoint of the identity network 105. In response to receiving the internal authorization code, the identity network 105 may return an internal access token to the relying party 110 at operation 360.

The relying party 110 may call the user information endpoint of the identity network 105 using the internal access token at operation 365. Upon receiving the internal access token, the identity network 105 may retrieve the identity attributes from the selected identity provider 120 by calling a user information endpoint of the identity provider 120 using the identity provider access token provided by the selected identity provider 120, as discussed above. The identity provider access token may be received by the identity network 105 before or after receiving the internal access token (i.e., the identity network 105 may exchange the identity provider authority token with the selected identity provider 120 before or after receiving the internal access token from the relying party 110). The identity network 105 may then provide the user's identity attributes to the relying party 110 at operation 370. Upon receiving the user's identity attributes, the relying party 110 may complete the flow with the user device 115 at operation 375. For example, the identity attributes may be provided for display on the user device 115. The user may review as part of a sign up/registration process for new users of the relying party 110. The user may verify the populated data and confirm the accuracy, and may then complete the registration process.

Figure 4A:
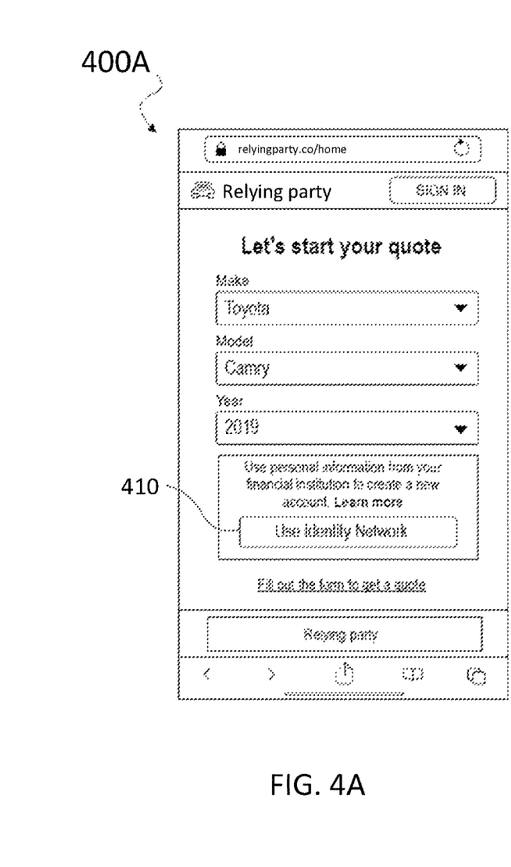
FIGS. 4A-4E illustrate screenshots of a user interface for a user device during an identity attribute sharing process according to an embodiment.
Figure 4B:
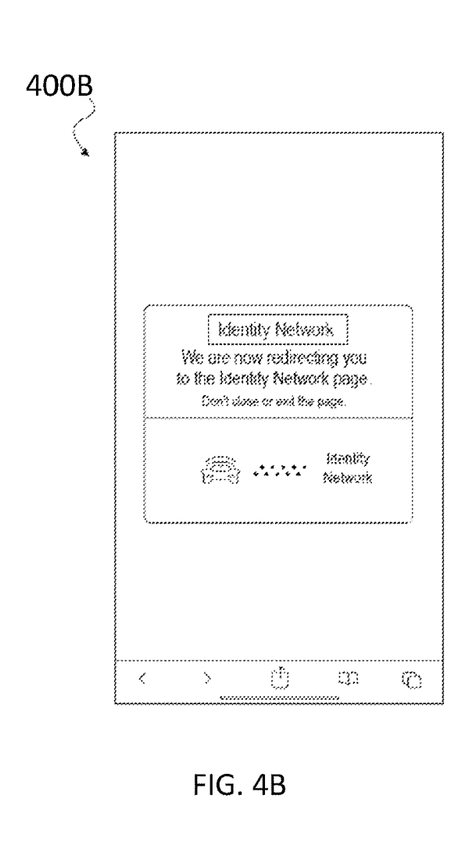
Figure 4C:
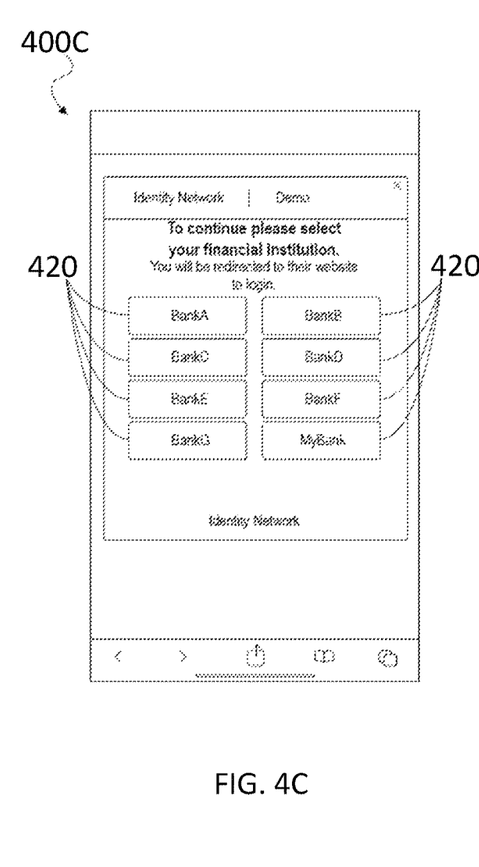

FIGS. 4A-4G illustrate screenshots that demonstrate a user's experience when completing an identity attribute sharing process, such as that described in relation to FIG. 3. As shown in FIG. 4A, the user may navigate to a signup page 400A of a relying party (e.g., an insurance provider) website and/or mobile application. The user may opt to utilize the identity network to register with the relying party, such as by interacting with an icon 410 and/or otherwise interacting with the signup page. Upon opting to use the identity network 105, the user may be presented with a redirect page 400B (shown in FIG. 4B) prior to being redirected to a page 400C, as shown in FIG. 4C. On page 400C, the user may select an identity provider 120, such as a financial institution, with which the user has a pre-existing relationship from a list of possible identity providers 120 that are enrolled in an identity attribute sharing system by interacting with one of icons 420 associated with an identity provider 120.

Figure 4D:
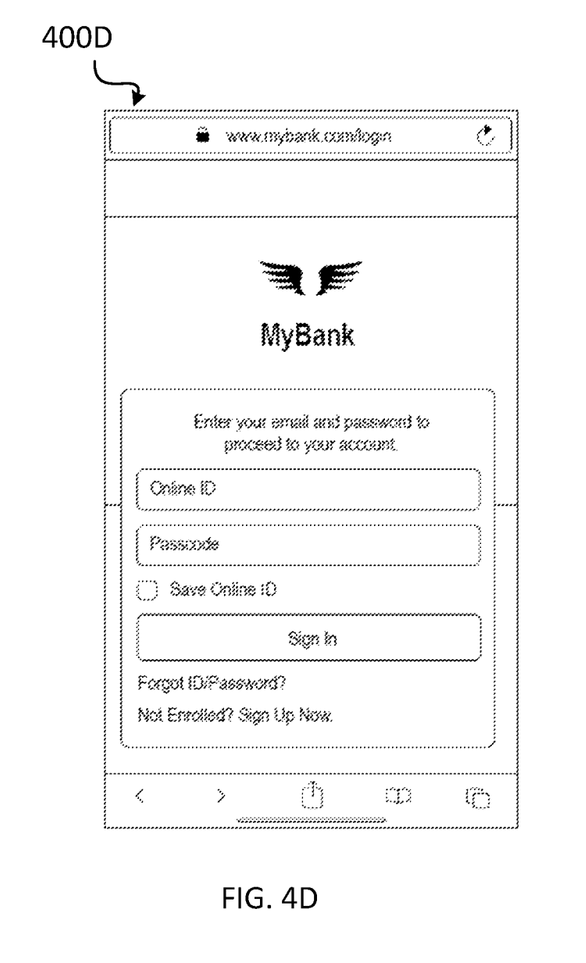
Figure 4E:
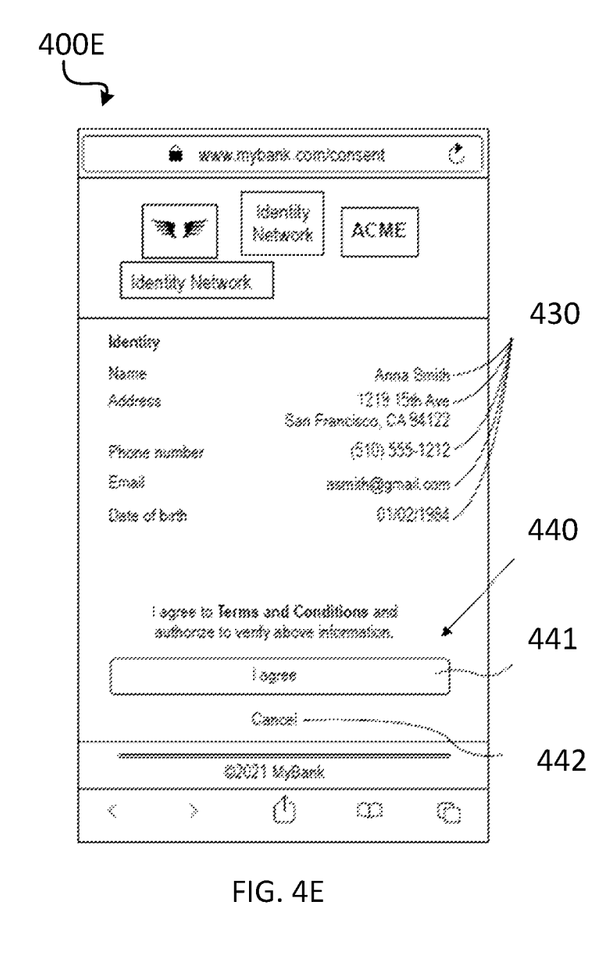

Once the user has selected an identity provider 120 (such as after operation 330, when the user has selected the icon 420 associated with the identity provider 120 MyBank), the user may be presented with a redirect page similar to page 400B prior to be redirected to a login page 400D of the selected identity provider 120, as shown in FIG. 4D. Once logged in, the user may be presented with a page 400E showing a number of identity attributes 430 that may be shared with the relying party 110 as shown in FIG. 4E. The user may review the identity attributes and decide whether to consent to the identity attributes 430 being shared with the relying party 110. For example, the user may interact with a consent request 440. Specifically, the user may interact with an icon 441 and/or otherwise interact with the screen to provide consent to share the identity attributes 430 or with an icon 442 to deny consent. Upon submitting a consent decision, the user may be presented with a redirect page similar to page 400B as the user is redirected to a page of the relying party 110. The page of the relying party 110 that the user is redirected to may be based on whether the user accepted or denied the consent to share. For example, if the user consented to share the identity attributes 430, the user may be redirected to a page to complete registration with the relying party 110. If the user denied the consent request 440, the user may be redirected to a page that requires the user to select a different identity provider 120 and/or to register manually. In some embodiments, the user may not be presented with any redirect pages and, instead, be redirected directly to the appropriate page. The interfaces illustrated in FIGS. 4D-4E may be all be part of operation 335 described above in relation to FIG. 3.

Figure 5A:
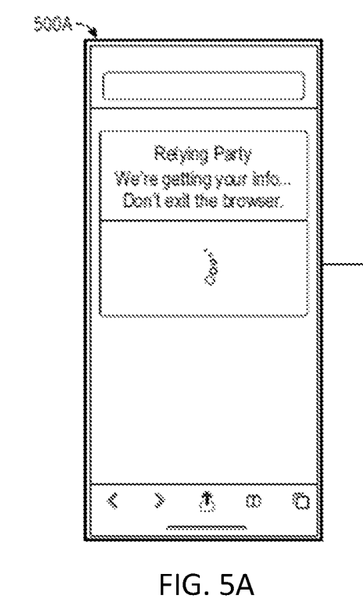
FIGS. 5A and 5B illustrate screenshots of a user interface for a user device during an identity attribute sharing process according to an embodiment.

FIGS. 5A and 5B illustrate screenshots that demonstrate a user's experience when completing the final identity attribute sharing/matching process, such as that described in relation to FIGS. 3 and 4A-4E. For example, upon submitting a consent decision (e.g., providing consent to share the identity attributes) and/or being redirected back to a page of the relying party 110 (such as shown in FIG. 4B), the user may be presented with a page 500A indicating that the relying party 110 is retrieving the user's identity attributes, as shown in FIG. 5A. FIG. 5A may be displayed, for example, during the performance of some or all of operations 340-370.

Figure 5B:
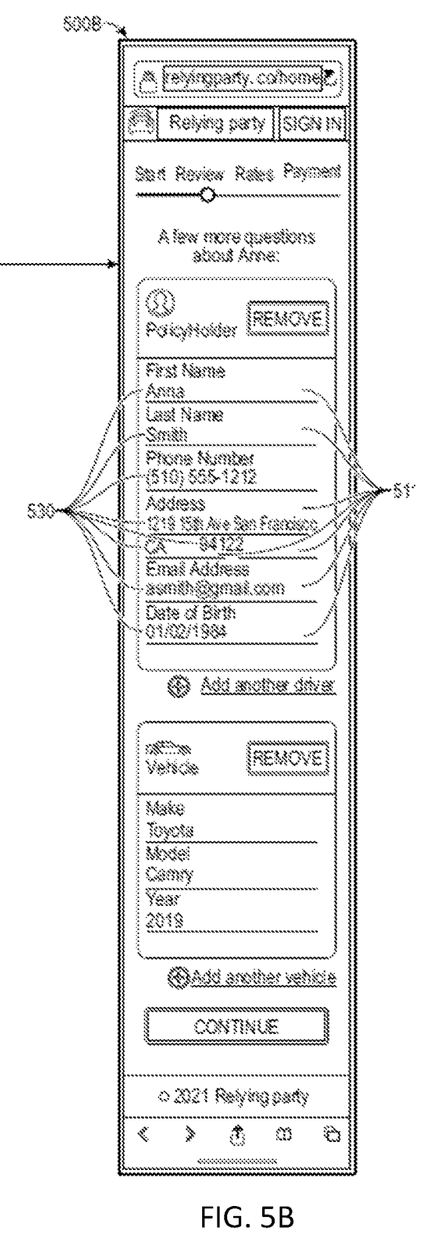

As shown in FIG. 5B, the user may be presented with a page 500B that shows the identity attributes 530 populated within relevant data fields 511 of the relying party 110 site and/or mobile application after the identity attributes 530 are retrieved by the user device 115 (such as described in relation to FIG. 3). For example, the relying party 110 may use the internal authorization code provided by the identity network 105 to call the token endpoint of the identity network 105 to acquire an internal access token, such as in operation 355. The internal access token may then be used by the relying party 110 to access the user's identity attributes, such as in operations 360-370. The identity attributes may be provided for display on the user device 115 for review by the user as part of a sign up/registration process for new users of the relying party 110. The user may verify the populated data and confirm the accuracy, and may then complete the registration process.

FIG. 6 illustrates a method 600 for sharing digital identity data in an account creation and/or sign in process. In some instances, method 600 may be used to authenticate a user that is already enrolled with a given relying party 110 by comparing identity attributes directly provided by the user to the relying party 110 and identity attributes provided by an identity provider 120 to authenticate the user for accessing the relying party's website. Method 600 may be performed by, for example, the identity network 105. Some portions of the method 600 may be performed by software development kits ("SDKs") provided by the identity network 105 to the identity providers 120 and the relying parties 110. In some embodiments, method 600 may begin by receiving, by an identity network 105, consent from a user device to share a plurality of identity attributes with a relying party 110 at operation 605. The identity attributes may be associated with a user of the user device. The identity attributes may include any information about the user including, for example, the user's first and last name, address, telephone number, email address, gender, birthdate, peer to peer payment account token, driver's license number, social security number, and/or other personal identification information, as discussed above.

Method 600 may include generating, by the identity network 105, an internal authorization code after receiving consent to share the identity attributes at operation 610. In some embodiments, the generation of the authorization code may be in response to the receipt of the consent and/or in response to receiving a request for an authorization code (such as a GET request). At operation 615, the internal authorization code may be provided to the user device 115.

The identity network 105 may receive the internal authorization code from the relying party 110 at operation 620. For example, after receiving the internal authorization code from the identity network 105, the user device 115 may submit a request to the relying party 110 to get the identity attributes. The request may include the internal authorization code. The relying party 110 may then submit a request (which may include the internal authorization code) to the identity network 105 for an internal access token that may be used to access the identity attributes of the user. In response to receiving the request/internal authorization code from the relying party 110, the identity network 105 may provide the internal access token to the relying party 110 at operation 625. The identity network 105 may receive the internal access token from the relying party 110 at operation 630. For example, the relying party 110 may submit a request for the user's identity attributes, with the request including the access token. In response to receiving the access token, the identity network 105 may provide the plurality of identity attributes to the relying party 110 at operation 635. Specifically, the identity network 105 may use an identity provider access token to access the user information from the selected identity provider 120. These identity attributes may then be communicated to the relying party 110 for use in registering the user. In some embodiments, the identity attributes may be encrypted prior to being transmitted to the relying party 110.

In some embodiments, prior to receiving the consent, an initial sign-up and identity provider selection process may be performed. For example, the identity network may receive a login request for a user from a relying party. The relying party may have specific information requested to fill out an application by the user. The user may provide a number of identity attributes to the relying party as part of the registration process. The identity network 105 may receive the identity attributes. An SDK in the relying party application may provide a list of identity providers to the user via the user interface for the user to select. The list of identity providers may include some or all identity providers that are enrolled in an identity attribute sharing system, including, for example, enrolled banks and other financial institutions. The user may select an identity provider with which the user has a relationship. For example, the user may select a bank or other financial institution that the user has an account with.

The relying party 110 application may launch, in response to receiving the selection of an identity provider 120, a login page of the mobile application and/or website of the identity provider 120. Each identity provider 120 will include a deep link and/or a web redirect link such that when the user is using a mobile application of the relying party 110, a deep link is used to launch the identity provider 120 mobile application. If the user is using a web application of the relying party 110, the web redirect link may launch a new tab or browser and open the web application of the identity provider 120. When the mobile application or web application is launched, the user may log into the identity provider 120 application and be provided a message confirming the authentication of the user, as discussed above. In some embodiments, single factor and/or multi-factor authentication techniques may be used to authenticate the user at the identity provider 120. In some embodiments, a confirmation of the authentication of the user by the identity provide may be communicated to the identity network 105. In some embodiments, this may include a confirmation message being communicated to the identity network 105.

The identity network may request and/or receive a number of identity attributes from the identity provider 120. The identity attributes may be presented for display to the user on the user interface of the user device 115, as discussed above. In some embodiments, the identity network 105 may cause the identity attributes to be presented to the user. In other embodiments, the identity provider 120 may directly provide the identity attributes to the user for display on the user interface. The identity provider 120 application may request consent from the user to share the identity attributes with the relying party 110, as discussed above, for matching purposes. While the consent request may appear to the user as being submitted by the identity provider, in reality the identity network is requesting and receiving the requisite consent for the transaction as the broker for the information exchange.

Figure 7:
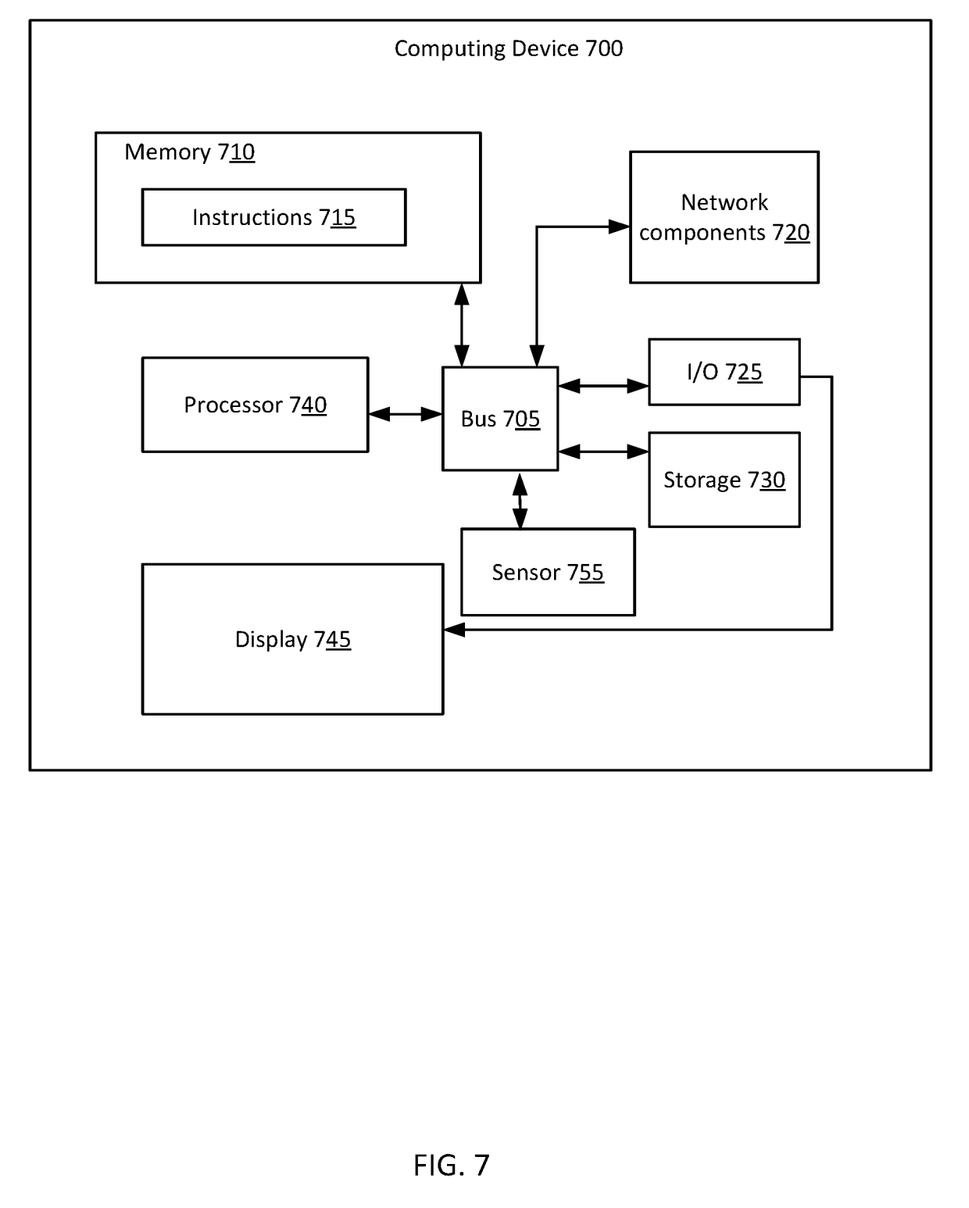
FIG. 7 illustrates an example computer system.

FIG. 7 illustrates a block diagram of an example computer system 700 usable for performing image analysis, normalization, and display. The computing device 700 can be or include, for example, a laptop computer, desktop computer, tablet, e-reader, smart phone or mobile device, smart watch, personal data assistant (PDA), or other electronic device.

The computing device 700 can include a processor 740 interfaced with other hardware via a bus 705. A memory 710, which can include any suitable tangible (and non-transitory) computer readable medium, such as RAM, ROM, EEPROM, or the like. The memory 710 may include embody program components (e.g., instructions 715) that configure operation of the computing device 700. In some examples, the computing device 700 can include input/output ("I/O") interface components 725 (e.g., for interfacing with a display 745, keyboard, or mouse) and additional storage 730.

The computing device 700 can include network components 720. Network components 720 can represent one or more of any components that facilitate a network connection. In some examples, the network components 720 can facilitate a wireless connection and include wireless interfaces such as IEEE 802.11, Bluetooth, or radio interfaces for accessing cellular telephone networks (e.g., a transceiver/antenna for accessing CDMA, GSM, UMTS, or other mobile communications network). In other examples, the network components 720 can be wired and can include interfaces such as Ethernet, USB, or IEEE 1394.

The computing device 700 may include a sensor 755. This may include a camera to capture images, microphone to record noises, a haptic sensor to detect pressure, or a biometric sensor to detect various biometric measurements (e.g., a fingerprint, heart rate, or the like).

Although FIG. 7 depicts a single computing device 700 with a single processor 740, the system can include any number of computing devices 700 and any number of processors 740. For example, multiple computing devices 700 or multiple processors 740 can be distributed over a wired or wireless network (e.g., a Wide Area Network, Local Area Network, or the Internet). The multiple computing devices 700 or multiple processors 740 can perform any of the steps of the present disclosure individually or in coordination with one another.

Each of the instructions, calculations, or operations described herein may be performed using a computer or other processor having hardware, software, and/or firmware. The various method steps may be performed by modules, and the modules may comprise any of a wide variety of digital and/or analog data processing hardware and/or software arranged to perform the method steps described herein. The modules optionally comprising data processing hardware adapted to perform one or more of these steps by having appropriate machine programming code associated therewith, the modules for two or more steps (or portions of two or more steps) being integrated into a single processor board or separated into different processor boards in any of a wide variety of integrated and/or distributed processing architectures. These methods and systems will often employ a tangible media embodying machine-readable code with instructions for performing the method steps described above. Suitable tangible media may comprise a memory (including a volatile memory and/or a non-volatile memory), a storage media (such as a magnetic recording on a floppy disk, a hard disk, a tape, or the like; on an optical memory such as a CD, a CD-R/W, a CD-ROM, a DVD, or the like; or any other digital or analog storage media), or the like. The instructions or operations may be stored in the non-transitory memory or memory device and executed by the processor, which causes the processor to perform the instructions or operations described.

Different arrangements of the components depicted in the drawings or described above, as well as components and steps not shown or described are possible. Similarly, some features and sub-combinations are useful and may be employed without reference to other features and sub-combinations. Embodiments of the invention have been described for illustrative and not restrictive purposes, and alternative embodiments will become apparent to readers of this patent. In certain cases, method steps or operations may be performed or executed in differing order, or operations may be added, deleted, or modified. It can be appreciated that, in certain aspects of the invention, a single component may be replaced by multiple components, and multiple components may be replaced by a single component, to provide an element or structure or to perform a given function or functions. Except where such substitution would not be operative to practice certain embodiments of the invention, such substitution is considered within the scope of the invention.

It is to be understood that the figures and descriptions of embodiments of the invention have been simplified to illustrate elements that are relevant for a clear understanding of the invention. Those of ordinary skill in the art will recognize, however, that these and other elements may be desirable. However, because such elements are well known in the art, and because they do not facilitate a better understanding of the invention, a discussion of such elements is not provided herein. It should be appreciated that the figures are presented for illustrative purposes and not as construction drawings. Omitted details and modifications or alternative embodiments are within the purview of persons of ordinary skill in the art.

The examples presented herein are intended to illustrate potential and specific implementations of the invention. It can be appreciated that the examples are intended primarily for purposes of illustration of the invention for those skilled in the art. There may be variations to these diagrams or the operations described herein without departing from the spirit of the invention. For instance, in certain cases, method steps or operations may be performed or executed in differing order, or operations may be added, deleted, or modified.

Furthermore, whereas particular embodiments of the invention have been described herein for the purpose of illustrating the invention and not for the purpose of limiting the same, it will be appreciated by those of ordinary skill in the art that numerous variations of the details, materials and arrangement of elements, steps, structures, and/or parts may be made within the principle and scope of the invention without departing from the invention as described in the claims.

All patents, patent publications, patent applications, journal articles, books, technical references, and the like discussed in the instant disclosure are incorporated herein by reference in their entirety for all purposes.

What is claimed is:

1. A method for sharing digital identity data, the method comprising, using an identity network:
   receiving an indication of consent from a user device to share a plurality of identity attributes with a relying party, wherein the plurality of identity attributes are associated with a user of the user device;
   receiving, from a selected identity provider, an identity provider authorization code that indicates that the selected identity provider authorizes the identity network to access the plurality of identity attributes from the selected identity provider;
   generating an internal authorization code after receiving the consent;
   providing the internal authorization code to the user device;
   receiving the internal authorization code from the relying party;
   in response to receiving the internal authorization code, providing an internal access token to the relying party;
   receiving the internal access token from the relying party;
   providing the identity provider authorization code to the selected identity provider;
   in response to providing the identity provider authorization code, retrieving the plurality of identity attributes from the selected identity provider; and
   in response to receiving the access token, providing the plurality of identity attributes to the relying party.

2. The method of claim 1, further comprising:
   receiving a sign-up request for the user from the relying party;
   displaying, within a user interface of a user device, a list of identity providers;
   receiving a selection of the selected identity provider from the list of identity providers;
   in response to receiving the selection, causing the user interface to display a login page associated with the selected identity provider; and
   receiving a validation of authentication of the user.

3. The method of claim 2, further comprising:
   receiving, from the identity provider, a plurality of identity attributes associated with the user; and
   in response to receiving the validation, displaying, within the user interface, the plurality of identity attributes associated with the user.

4. The method of claim 1, wherein the identity provider authorization code is received after or during receipt of the consent from the user device.

5. The method of claim 1, wherein:
   providing the plurality of identity attributes to the relying party comprises encrypting the plurality of identity attributes and transmitting the plurality of identity attributes to the relying party.

6. The method of claim 1, wherein:
   the plurality of identity attributes comprise at least one identity attribute selected from a group comprising of a name of the user, an address of the user, a telephone number of the user, an email address of the user, a gender of the user, a birthdate of the user, a peer to peer payment account token of the user, a driver's license number of the user, and a social security number of the user.

7. An identity network for sharing digital identity data, comprising:
   one or more processors; and
   a memory having stored thereon instructions that, upon execution by the one or more processors, cause the one or more processors to:
      receive consent from a user device to share a plurality of identity attributes with a relying party, wherein the plurality of identity attributes are associated with a user of the user device;
      receive, from a selected identity provider, an identity provider authorization code that indicates that the selected identity provider authorizes the identity network to access the plurality of identity attributes from the selected identity provider;
      generate an internal authorization code after receiving the consent;
      provide the internal authorization code to the user device;
      receive the internal authorization code from the relying party;
      in response to receiving the internal authorization code, provide an access token to the relying party;
      receive the access token from the relying party;
      provide the identity provider authorization code to the selected identity provider;
      in response to providing the identity provider authorization code, retrieve the plurality of identity attributes from the selected identity provider; and
      in response to receiving the access token, provide the plurality of identity attributes to the relying party.

8. The identity network for sharing digital identity data of claim 7, wherein the instructions further cause the one or more processors to:
   receive a sign-up request for the user from the relying party;
   display within a user interface of a user device, a list of identity providers;
   receive a selection of the selected identity provider from the list of identity providers;
   in response to receiving the selection, cause the user interface to display a login page associated with the selected identity provider; and
   receive a validation of authentication of the user.

9. The identity network for sharing digital identity data of claim 8, wherein the instructions further cause the one or more processors to:
   receive from the identity provider, the plurality of identity attributes associated with the user; and
   in response to receiving the validation, display the plurality of identity attributes associated with the user within the user interface.

10. The identity network for sharing digital identity data of claim 7, wherein:
    providing the plurality of identity attributes to the relying party comprises encrypting the plurality of identity attributes and transmitting the plurality of identity attributes to the relying party.

11. The identity network for sharing digital identity data of claim 7, wherein:
    the plurality of identity attributes comprise at least one identity attribute selected from a group comprising of a name of the user, an address of the user, a telephone number of the user, an email address of the user, a gender of the user, a birthdate of the user, a peer to peer payment account token of the user, a driver's license number of the user, and a social security number of the user.

12. The identity network for sharing digital identity data of claim 7, wherein the identity provider authorization code is received after or during receipt of the consent from the user device.

13. A non-transitory computing-device readable storage medium on which computing-device readable instructions of a program are stored, the instructions, when executed by one or more computing devices of an identity network, causing the one or more computing devices to perform a method, comprising:
   receiving an indication of consent from a user device to share a plurality of identity attributes with a relying party, wherein the plurality of identity attributes are associated with a user of the user device;
   receiving, from a selected identity provider, an identity provider authorization code that indicates that the selected identity provider authorizes the identity network to access the plurality of identity attributes from the selected identity provider;
   generating an internal authorization code after receiving the consent;
   providing the internal authorization code to the user device;
   receiving the internal authorization code from the relying party;
   in response to receiving the internal authorization code, providing an internal access token to the relying party;
   receiving the internal access token from the relying party;
   providing the identity provider authorization code to the selected identity provider;
   in response to providing the identity provider authorization code, retrieving the plurality of identity attributes from the selected identity provider; and
   in response to receiving the access token, providing the plurality of identity attributes to the relying party.

14. The non-transitory computing-device readable storage medium of claim 13, further comprising:
   receiving a sign-up request for the user from the relying party;
   displaying, within a user interface of a user device, a list of identity providers;
   receiving a selection of the selected identity provider from the list of identity providers;
   in response to receiving the selection, causing the user interface to display a login page associated with the selected identity provider; and
   receiving a validation of authentication of the user.

15. The non-transitory computing-device readable storage medium of claim 14, further comprising:
   receiving, from the identity provider, a plurality of identity attributes associated with the user; and
   in response to receiving the validation, displaying, within the user interface, the plurality of identity attributes associated with the user.

16. The non-transitory computing-device readable storage medium of claim 13, wherein:
   providing the plurality of identity attributes to the relying party comprises encrypting the plurality of identity attributes and transmitting the plurality of identity attributes to the relying party.

17. The non-transitory computing-device readable storage medium of claim 13, wherein:
   the plurality of identity attributes comprise at least one identity attribute selected from a group comprising of a name of the user, an address of the user, a telephone number of the user, an email address of the user, a gender of the user, a birthdate of the user, a peer to peer payment account token of the user, a driver's license number of the user, and a social security number of the user.

* * * * *